(12) United States Patent
Huang et al.

(10) Patent No.: US 10,937,440 B2
(45) Date of Patent: Mar. 2, 2021

(54) INFORMATION HANDLING SYSTEM MICROPHONE NOISE REDUCTION

(71) Applicant: Dell Products L.P., Round Rock, TX (US)

(72) Inventors: Chien-Yu Huang, New Taipei (TW); Shih Chia-Hung, Taipei (TW); Chu Shu Hsuan, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 40 days.

(21) Appl. No.: 16/266,533

(22) Filed: Feb. 4, 2019

(65) Prior Publication Data

US 2020/0251122 A1     Aug. 6, 2020

(51) Int. Cl.

| | |
|---|---|
| *G10K 11/178* | (2006.01) |
| *G10L 21/0224* | (2013.01) |
| *H04R 3/04* | (2006.01) |
| *G06F 1/26* | (2006.01) |
| *G06F 1/20* | (2006.01) |
| *G10L 21/0216* | (2013.01) |
| *G10L 21/0208* | (2013.01) |

(52) U.S. Cl.
CPC .......... *G10L 21/0224* (2013.01); *G06F 1/203* (2013.01); *G06F 1/26* (2013.01); *H04R 3/04* (2013.01); *G10L 2021/02085* (2013.01); *G10L 2021/02163* (2013.01); *H04R 2499/15* (2013.01)

(58) Field of Classification Search
CPC ..... H04R 2225/41; H04R 25/70; F24F 11/30; A61L 9/122
USPC ................... 381/71.1, 71.2, 71.3, 71.8, 71.11
See application file for complete search history.

(56) References Cited

U.S. PATENT DOCUMENTS

| | | |
|---|---|---|
| 8,085,948 B2 | 12/2011 | Thomas et al. |
| 8,218,781 B1 | 7/2012 | Swanke |
| 8,515,095 B2 | 8/2013 | Bard |
| 8,855,329 B2 | 10/2014 | Slapak et al. |
| 2009/0092261 A1* | 4/2009 | Bard ..................... G06F 1/3287 381/71.1 |
| 2010/0028134 A1* | 2/2010 | Slapak .............. G10K 11/17873 415/119 |
| 2011/0293123 A1* | 12/2011 | Neumeyer ........... H04R 25/558 381/314 |

\* cited by examiner

*Primary Examiner* — George C Monikang
(74) *Attorney, Agent, or Firm* — Zagorin Cave LLP; Robert W. Holland (57) ABSTRACT

An information handling system audio system includes a library of noise reduction filters associated with cooling fan speeds to isolate out cooling fan noise. Changed cooling fan settings communicated to the audio system trigger application of a library noise reduction filter for the selected cooling fan setting to isolate out cooling fan noise while an adaptive filter defines a noise reduction filter from recorded sounds. The library noise reduction filter reduces cooling fan noises during the time used to determine the adaptive noise reduction filter. In one embodiment, changes in cooling fan settings prioritize definition of noise reduction filters by the adaptive filter.

13 Claims, 5 Drawing Sheets

INFORMATION HANDLING SYSTEM MICROPHONE NOISE REDUCTION

BACKGROUND OF THE INVENTION

Field of the Invention

The present invention relates in general to the field of information handling system audio capture, and more particularly to an information handling system microphone noise reduction.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components into a portable housing to support end user interactions without external cable connections. For example, portable information handling systems typically integrate a touchscreen display to present information as visual images and accept touches as end user inputs, and a battery to power processing components. Tablet information handling systems generally have a single planar housing with the integrated display exposed at one side to cover processing components disposed in the housing. Convertible information handling systems generally have main and lid housing portions rotationally coupled to each other with the display integrated in the lid housing portion and a keyboard integrated in the main housing portion. Convertible information handling systems rotate the housing portions from a closed position to a clamshell position that supports the display in a vertical alignment for viewing and above the keyboard. Further rotation of the housing portions a full 360 degrees to a tablet position exposes the display like a tablet while the keyboard is hidden at the bottom of the system. Convertible systems often integrate a processor and other processing components in the main housing portion, although 2-in-1 systems place the processing components under the display so that the lid housing portion can disconnect from the main housing portion for use as a tablet.

To support mobile usage modes, manufacturers generally attempt to reduce the size and weight of portable information handling systems. Generally, portable information handling systems have a length and width defined by the display size so that reducing the size and weight depends upon the vertical height of processing components disposed under the display. Portable information handling systems intended primarily for consuming information, such as telephones and tablets that primarily support phone calls, web browsing and email, tend to include less powerful processing components than do portable information handling systems that perform more complex processing tasks. Integrating less powerful processing components often eliminates the need for active thermal rejection of excess thermal energy from the housing. Thus, for example, telephone and tablet information handling systems typically rely upon passive thermal cooling while convertible information handling systems typically include active thermal rejection that uses an integrated cooling fan, which tend to increase system height.

One difficulty with including a cooling fan in a portable information handling system is that cooling fans tend to generate acoustical noise that can distract an end user. Since portable information handling systems often engage in communication tasks, such as Voice over Internet Protocol (VOIP) calls, video conferencing and audio recordings, acoustical noise associated with a cooling fan can impact the quality of sound recorded by microphones integrated with the portable information handling system. Generally, to decrease this interference, portable information handling systems integrate the microphone in a location away from the cooling fan and the cooling fan's exhaust. In addition, the microphone's audio codec typically includes noise reduction filters that reduce the impact of the cooling fan noise on recorded sound. However, in some instances tight constraints within a housing to reduce system size forces cooling fan placement in proximity with the microphone. For example, 2-in-1 systems that integrate the processing components under the display and also include a cooling fan tend to place both the cooling fan exhaust and the microphone along the upper side of the housing. Further, as cooling fan rotation speed adjusts to adapt to changing thermal conditions, noise reduction filters adjust to changes in the cooling fan noise over time, resulting in at least intermittent periods of reduced effectiveness.

SUMMARY OF THE INVENTION

Therefore, a need has arisen for a system and method which reduces acoustical noise captured at a portable information handling system microphone.

In accordance with the present invention, a system and method are provided which substantially reduce the disadvantages and problems associated with previous methods and systems that support noise reduction of audible sounds captured by a portable information handling system microphone. An audio processor receives cooling fan settings and selects a library noise reduction filter stored in association with the cooling fan setting to filter audible sounds captured by a microphone while an adaptive filter converges on noise in recorded sounds.

More specifically, an information handling system processes information with a central processing unit (CPU) and memory disposed in a housing, such as by executing instructions of an operating system and applications. A cooling fan provides cooling airflow across the CPU to reject excess thermal energy. An embedded controller operates the cooling fan at plural settings based upon sensed thermal conditions to maintain desired operating constraints, such as by providing a pulse width modulation (PWM) to the cooling fan. A microphone disposed at the housing captures audible sounds as electronic signals, such as a human voice during a VoIP communication, and provides the audible sound electronic signals to an audio processor, such as a CODEC that converts analog audible sound electronic signals to a digital format. An adaptive filter analyzes recorded audible sound electronic signals to define an adaptive noise reduction filter that filters out noise, such as audible noise associated with cooling fan operation. The embedded controller communicates changes to cooling fan settings to the audible processor and, in response, the audible processor retrieves a library noise reduction filter to apply to captured audible electronic signals that filters noise associated with the received cooling fan setting while the adaptive filter converges on the actual noise associated with the cooling fan. In one embodiment, the adaptive filter processing is accelerated in response to changes in cooling fan settings and the adaptive filter replaces the library noise reduction filter if predetermined similarities exist.

The present invention provides a number of important technical advantages. One example of an important technical advantage is that acoustical noise associated with cooling fan operation at a portable information handling system is aggressively filtered by applying a filter library when changes in cooling fan operation are detected. Library filters reduce noise associated with a cooling fan speed selection contemporaneous with a command to change the cooling fan speed so that audio recordings experience less interference while an adaptive filter converges on new noise patterns associated with changing fan speed. In one example embodiment, applying a library filter at a cooling fan speed change reduces cooling fan noise over a three to four second convergence time taken by an adaptive filter to eliminate the noise. In addition, adaptive filter noise reduction convergence to acoustical characteristics associated with newly commanded fan speeds takes place in a more rapid manner by allocation of additional processing resources for filter adaption upon initiation of a fan speed change.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system audio processor receives cooling fan settings and applies library noise reduction filters associated with the cooling fan settings to filter audible sounds captured by a microphone during convergence of an adaptive filter to the cooling fan noise. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
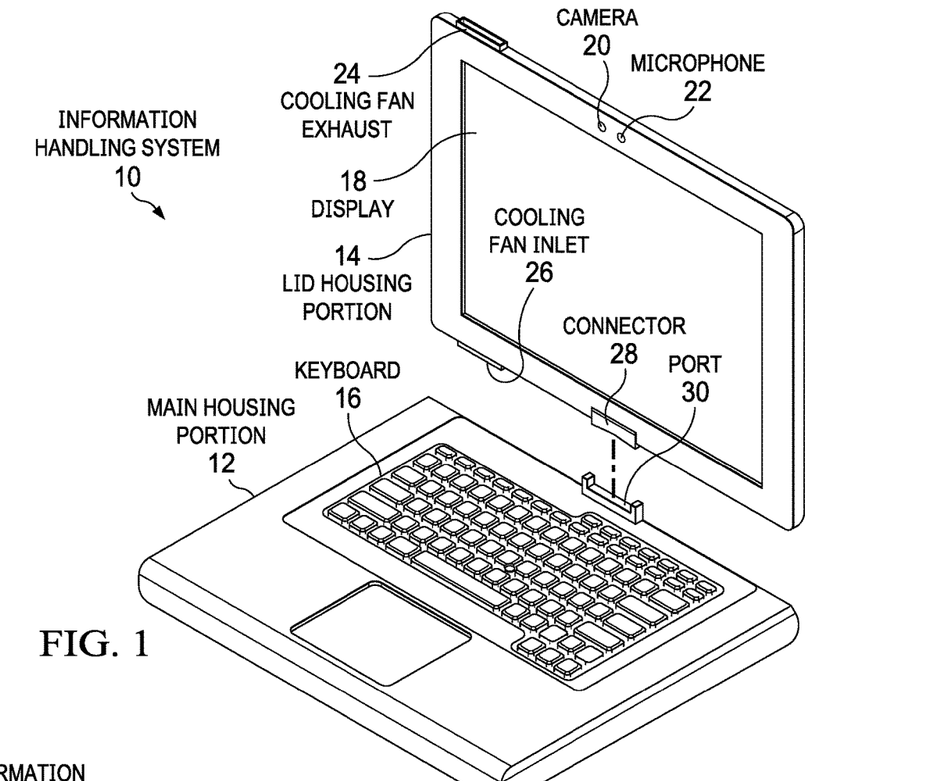
FIG. 1 depicts a portable information handling system that processes audible sounds.

Referring now to FIG. 1, a portable information handling system 10 that processes audible sounds is depicted. In the example embodiment, information handling system 10 has a portable configuration with a main housing portion 12 rotationally coupled to a lid housing portion 14, such as to rotate between closed, clamshell and tablet configurations. Main housing portion 12 includes a keyboard 16 that accepts typed inputs from an end user. Lid housing portion 14 integrates a touchscreen display 18 that presents information as visual images. A camera 20 and microphone 22 integrated in lid housing portion 14 capture audiovisual information, such as to support a videoconference or VoIP communication. Excess thermal energy is rejected from lid housing portion 14 through a cooling fan exhaust 24, such as by an integrated cooling fan that draws cooling airflow into a cooling fan inlet 26 and across processing components before leaving through exhaust 24.

In the example embodiment, information handling system 10 has a 2-in-1 configuration with a connector 28 inserted into a port 30 to establish communication between keyboard 16 and processing components within lid housing portion 14. An end user may elect to use lid housing portion 14 as a separate tablet device by separating connector 28 from port 30. To support operation as a tablet device, lid housing portion 14 includes the processing components, such as the CPU and memory that execute an operating system and applications. A challenge to such a usage mode is that cooling fan exhaust 24 is placed in closer proximity to microphone 22 so that noise from the cooling airflow degrades sounds captured by microphone 22. In addition, other processing components within lid housing portion 14 that generate audible noise can create a more significant audible noise profile. Alternative embodiments that include processing components and a cooling fan in main housing portion 12 will also generate audible noise that microphone 22 captures, however, the greater distance provided by placement in the main housing portion 12 tends to reduce the impact of such noise.

Figure 2:
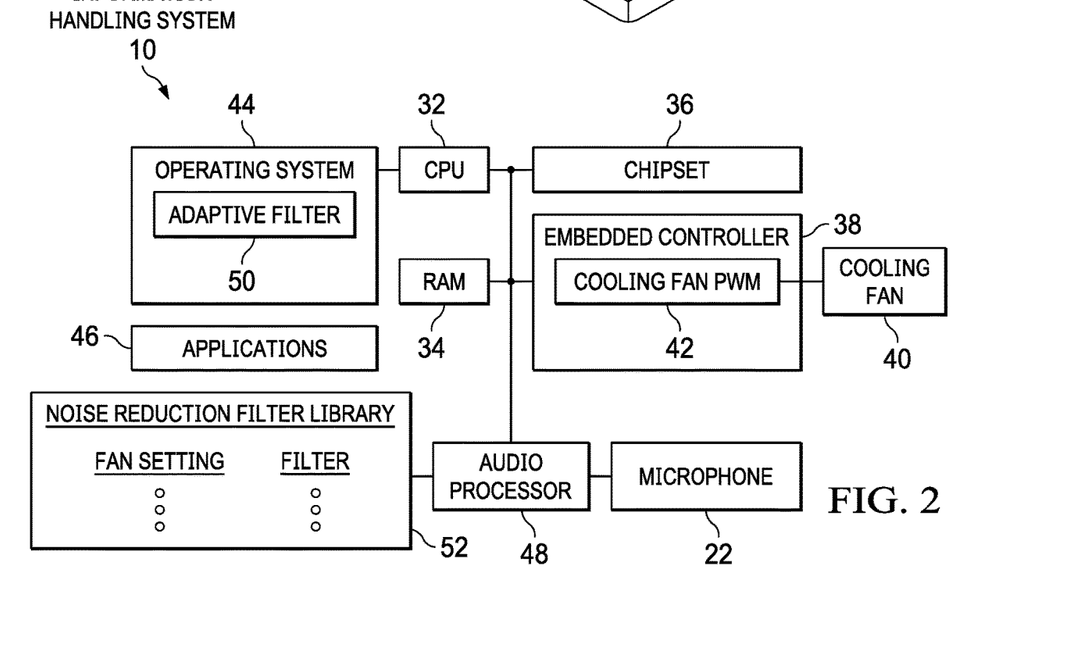
FIG. 2 depicts a block diagram of an information handling system that applies noise reduction filters to audible sounds captured by microphone.

Referring now to FIG. 2, a block diagram depicts an information handling system 10 that applies noise reduction filters to audible sounds captured by microphone 22. In the example embodiment, a central processing unit (CPU) 32 executes instructions to process information supported by random access memory (RAM) 34, which stores the instructions and information. A chipset 36 coordinates operation of CPU 32 with supporting functions and interactions with other processing components, such as communications links and graphics processing. An embedded controller 38 executes embedded codes, such as firmware instructions stored in flash memory, to manage power and peripheral interactions. For example, embedded controller 38 is a keyboard controller that accepts keyboard and mouse inputs and provides the inputs to CPU 32. In the example embodiment, embedded controller 38 manages thermal conditions by controlling a cooling fan 40 with pulse width modulation (PWM) signals generated by a cooling fan PWM module 42. In alternative embodiments, other types of embedded controllers may be used to manage cooling fan operation, such as a controller integrated in cooling fan 40. Embedded controller 38 tracks the PWM value used to control cooling fan 40, such as with a percent of "on" time commanded at cooling fan 40.

An operating system 44 executes on CPU 32 to manage system operations and provide application programming interfaces (APIs) that applications 46 access to interact with physical components of information handling system 10. As an example, a VoIP or videoconferencing application 46 executing on CPU 32 accesses display, camera and microphone resources through APIs of operating system 44 to support a VoIP or videoconference presentation at information handling system 10. Microphone 22 captures audible sounds as electronic signals, such as analog signals resulting from electromechanical sensors interacting with sound waves. An audio processor 48 interfaces with microphone 22 to receive the audible sound electronic signals and convert the signals to a digital format that CPU 32 can process, such as with a hardware or firmware CODEC. In the example embodiment, audio processor 48 includes a noise reduction filter that removes noise from the captured audible sound electronic signal. An adaptive filter 50 included in an operating system driver of the audio system analyzes recorded sounds to define an adaptive noise reduction filter that filters out noise identified in signals captured by microphone 22. For instance, audio processor 48 periodically sends unfiltered recorded audio sounds to adaptive filter 50 for analysis that identifies noise patterns, such as noise associated with airflow in proximity to microphone 22 caused by cooling fan exhaust. Adaptive filter 50 generates a noise reduction filter that cancels out unwanted noise and provides the noise reduction filter to audio processor 48 so that processed audio information provided to CPU 32 eliminates or cancels out the undesired noise. Although the example embodiment focuses on noise associated with cooling fan airflow exhaust, other types of noise patterns may be identified and filtered out by adaptive filter 50, such as vibrations associated with electronic components disposed in the information handling system. The example embodiment distributes the overall audio system between microphone 22, audio processor 48 and CPU 32; however, in alternative embodiments, an integrated audio system may include the audio system as a single package, such as by executing adaptive filter 50 on audio processor 48 with a digital signal processor (DSP) or other processing resources.

Figure 3A:
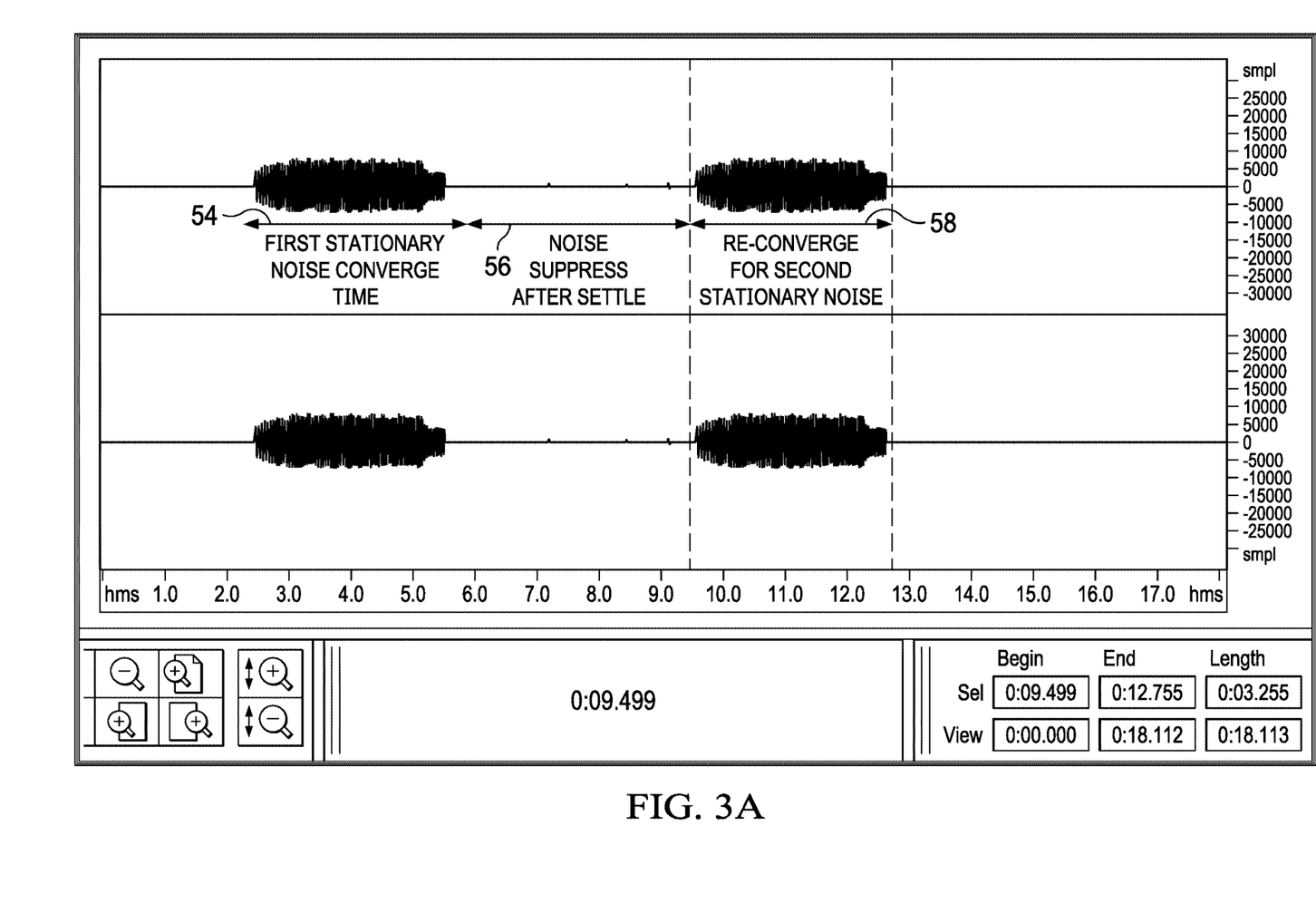
FIG. 3A depicts a graph of operation of a conventional adaptive filter that converges on noise cancelation over time.

Referring now to FIG. 3A, a graph depicts operation of a conventional adaptive filter that converges on noise cancelation over time. In the example embodiment, over the time period indicated by arrow 54, adaptive filter 50 detects a first cooling fan noise in captured audible signals and defines a filter that cancels out the noise so that over the time period indicated by arrow 56 the noise is effectively eliminated in audible signals provided to CPU 32. At the start of the time period indicated by arrow 58, a second cooling fan noise source is introduced and addressed by adaptive filter 50 defining a new noise reduction filter to cancel out the noise. As is illustrated by the depicted noise signal, adaptive filter 50 converges on new noise signals to cancel out those noise signals over a time period of three to four seconds. In a usage mode where microphone 22 is recording audio for an application, introduction of noise sources may interfere with the application for the 3 to 4 second time period during which adaptive filter 50 converges on a new noise reduction filter. As an example, changes in thermal conditions at information handling system 10 that alter cooling fan operations can reduce the quality of recorded sounds during adaptive filter 50 convergence, thus interfering with end user audible communications.

Referring back to FIG. 2, audio processor 48 enhances captured audio by retrieving and applying library noise reduction filters stored in a noise reduction filter library 52 while adaptive filter 50 converges on an adaptive filter to cancel new noise profiles. In the example embodiment, embedded controller 38 interfaces with audio processor 48, such as through an I2C interface, to report changes to cooling fan settings, such as at each PWM change applied by cooling fan PWM module 42 to cooling fan 40. For instance, embedded controller 38 reports the PWM percent commanded to cooling fan 40. Audio processor 48 looks up a noise reduction filter from library 52 associated with the PWM value and applies the library noise reduction filter to audio signals captured by microphone 22. Rapid application of a library noise reduction filter aids in noise reduction during the time period over which adaptive filter 50 converges on new audible noise created by changes in cooling fan operations. In one embodiment, operating system 44 also monitors cooling fan settings and, in response to a change in cooling fan settings increases the priority of processing associated with adaptive filter 50 to provide a more rapid adaptive noise reduction filter convergence. Once adaptive filter 50 achieves convergence, a comparison of the library and adaptive noise reduction filters is performed, such as at audio processor 48, to determine if sufficient similarities exist to that audio processor 48 can disable the library noise reduction filter. If the overlap between the library and adaptive noise reduction filters is not sufficient, then audio processor 48 may continue to use both noise reduction filters.

In alternative embodiments, noise reduction filter library 52 may be applied by operating system 44 or other components, although a direct interface with the cooling fan controller provides a desirable rapid filter application. Other processing may further enhance noise reduction and adaption to changing noise conditions. For example, if microphone 22 is actively reporting captured audio to an application, embedded controller 38 may alter cooling fan operations to enhance noise reduction. For instance, embedded controller 38 may delay cooling fan setting changes until active use of microphone 22 has decreased, such as during times when an end user is not speaking. As another example, embedded controller 38 may select a cooling fan setting that corresponds to fan settings having associated stored filters in library 52. For instance, a cooling fan setting change from 42 percent to 57 percent may be altered to 60 percent to match a filter stored in library 52 for a 60 percent fan setting. As another example, audio processor 48 may update library 52 by storing filters in association with reported cooling fan settings. For instance, if cooling fan 40 tends to settle at 37 percent operation, audio processor 48 may store the filter used during operation of cooling fan 40 at 37 percent to more accurately filter out noise when the operating conditions match that setting.

Figure 3B:
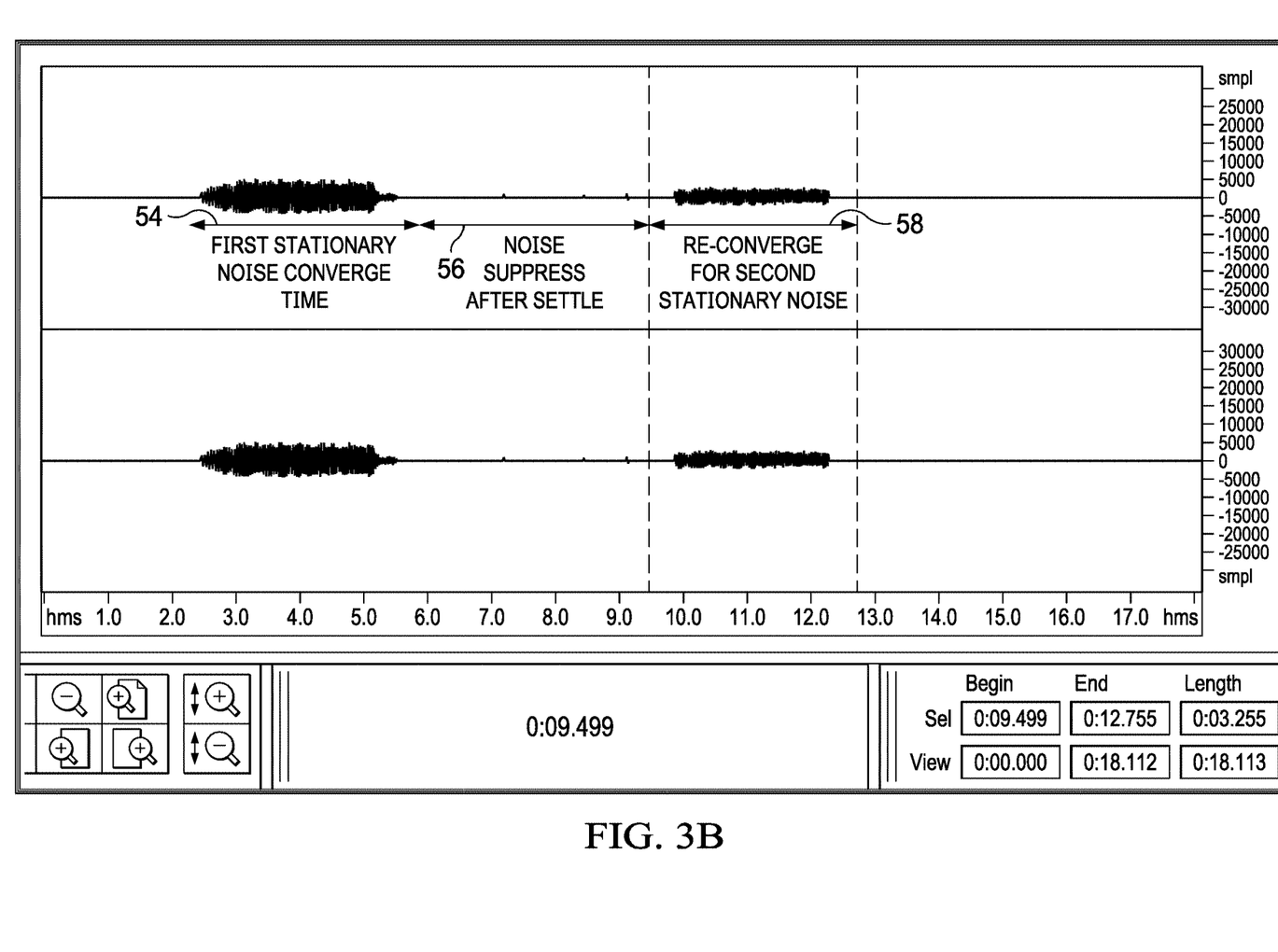
FIG. 3B depicts a graph of operation of an adaptive filter applying a library noise reduction filter based upon cooling fan settings.

Referring now to FIG. 3B, a graph depicts operation of an adaptive filter applying a library noise reduction filter based upon cooling fan settings. In the example embodiment, over the time period indicated by arrow 54, adaptive filter 50 detects a first cooling fan noise in captured audible signals, applies a library filter based upon cooling fan settings and then defines a filter that cancels out the noise so that over the time period indicated by arrow 56 the noise is effectively eliminated in audible signals provided to CPU 32. As compared with noise filter response of FIG. 3A, noise initially has less impact based upon the immediate filtering of the library filter and reduces more quickly to a canceled state. At the start of the time period indicated by arrow 58, a second cooling fan noise source is introduced and addressed by adaptive filter 50 apply a library filter for the cooling fan settings and then defining a new noise reduction filter to cancel out the additional noise. As is illustrated by the depicted noise signal, adaptive filter 50 converges initially on new noise signals to cancel out those noise signals over a time period of three to four seconds but with a better initial noise reduction than that of FIG. 3A. The noise filter response for the second cooling fan is more rapid and initially at a lower value of noise than in FIG. 3A. In a usage mode where microphone 22 is recording audio for an application, introduction of noise sources may interfere with the application for the 3 to 4 second time period during which adaptive filter 50 converges on a new noise reduction filter. As an example, changes in thermal conditions at information handling system 10 that alter cooling fan operations can reduce the quality of recorded sounds during adaptive filter 50 convergence, thus interfering with end user audible communications. Initializing the noise filter from a library based upon cooling fan settings provides reduced noise initially and more rapid noise response for subsequent cooling fan operations.

Figure 4:
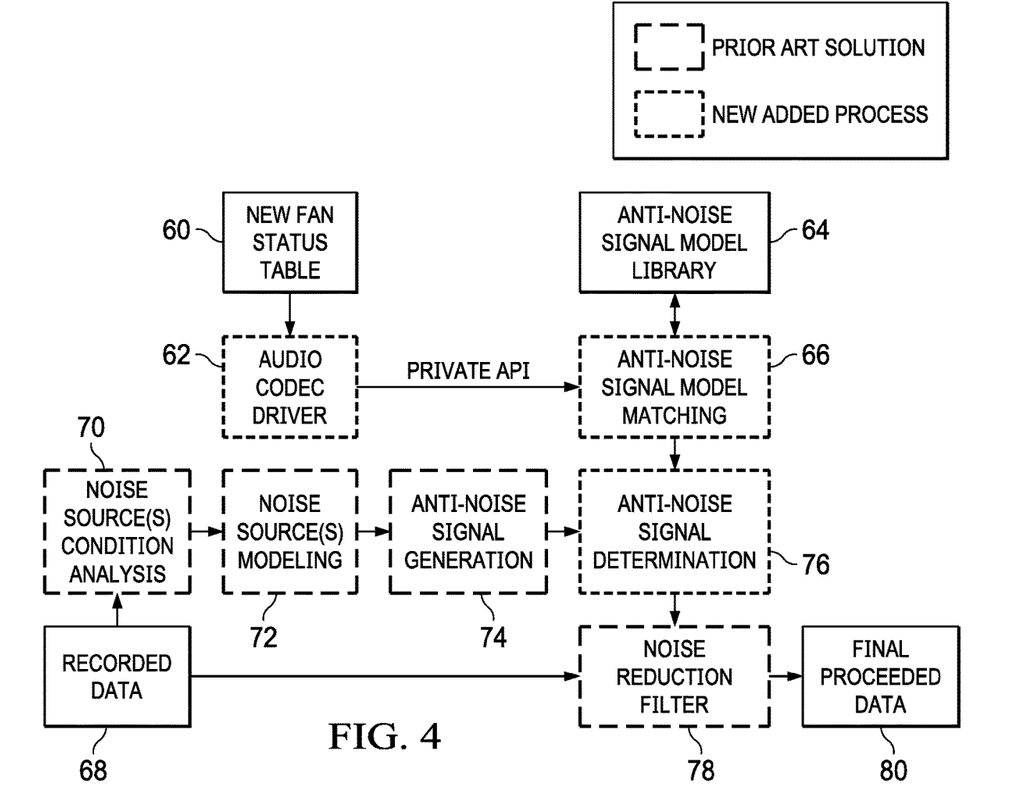
FIG. 4 depicts a flow diagram of a process for applying noise reduction filters to audible sounds captured by a microphone.

Referring now to FIG. 4, a flow diagram depicts a process for applying noise reduction filters to audible sounds captured by a microphone. At step 68 audible sounds are captured by a microphone, such as analog or digital electronic signals. The recorded audible sound electronic signals are provided at step 78 to a noise reduction filter to output filtered audible sound electronic signals at step 80, such as a digital stream of audio information provided to a CPU. As audible sound electronic signals are captured at step 68, adaptive filtering of unfiltered recorded audible sounds is performed at steps 70-74 in a conventional manner. At step 70 noise source conditions are analyzed to identify noise. At step 72, the identified noise sources are modeled so that at step 74 an anti-noise signal generation may be performed to cancel out the modeled noise sources. If no library noise filters are determined at step 76, the adaptive filter applies the noise cancelation at step 78. In various embodiments, the noise cancelation may be performed to analog or digital representations of audio captured and recorded from the microphone. Without application of a library noise filter, steps 70-74 repeat at periodic intervals to adapt noise cancelation to changing conditions.

At step 60, a change in operations proximate the microphone is detected external to the audio system and reported to the audio processor, such as a new cooling fan setting. In the example embodiment, the change in status is reported as a status table entry, such as an index that associates the reported change to a noise filter profile. For instance, different hardware components of an information handling system may report an index value to a table defined for the hardware component. The table entry is reported at step 62 of an audio codec driver of the audio processor, such as in cooperating with an operating system API. At step 66, an anti-noise signal model matching for the table entry is performed at the anti-noise signal model library 64. The library noise filter is provided at step 76 for an anti-noise signal determination that compares the adaptive noise filter with the library noise filter to determine a cumulative noise filter for application to audio recorded at step 68. If the library noise filter has noise cancelation characteristics not included in the adaptive filter, then both filters are applied to the audio signal. As the adaptive filter converges on the actual noise signature created by the changed cooling fan operations, the similarities with the library filter should increase to eventually rely on only the adaptive filter for noise cancelation. In one embodiment, library noise filters may be phased out of use after a defined convergence time, such as 4 seconds, even if filter characteristic do not sufficiently align.

Figure 5:
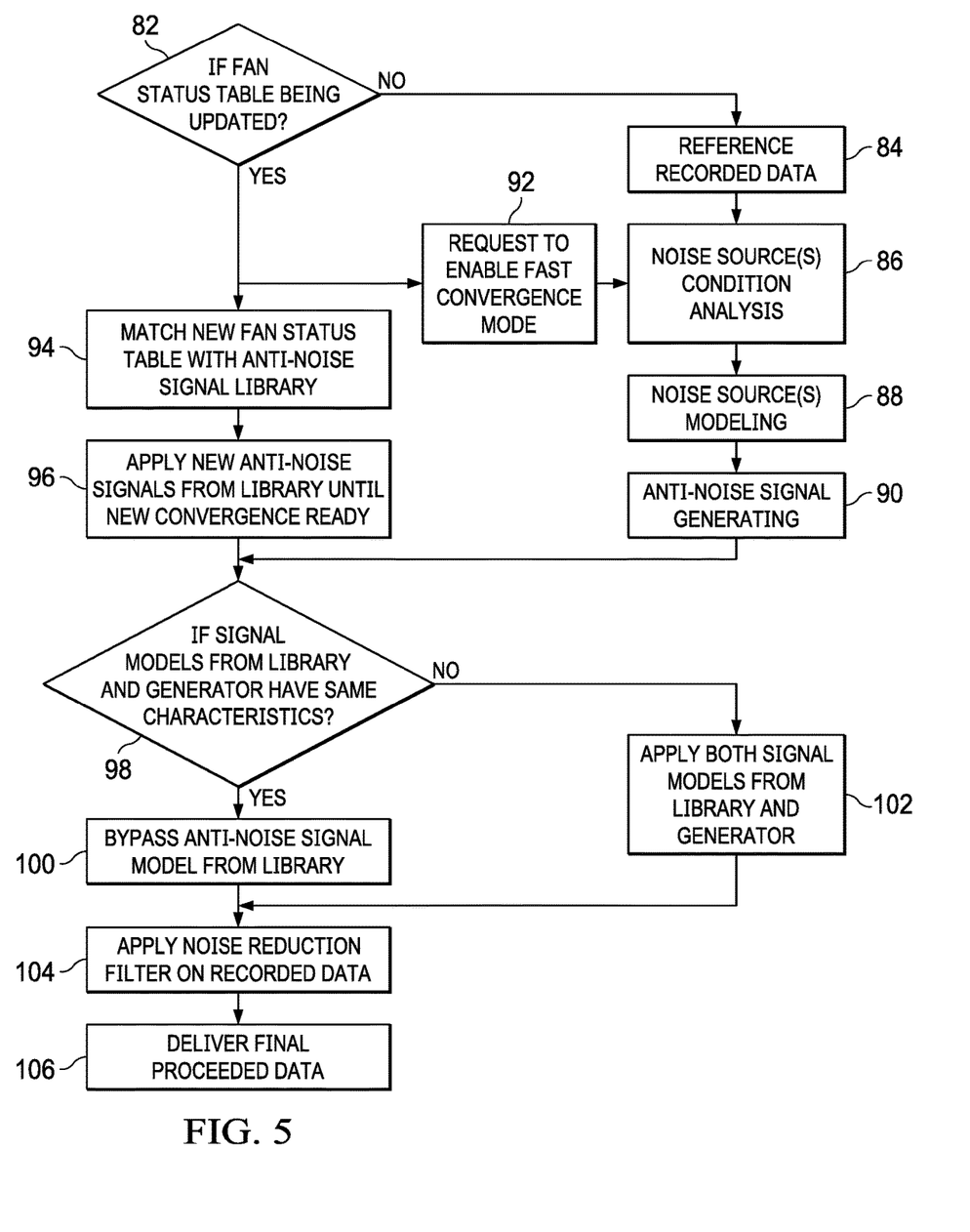
FIG. 5 depicts a flow diagram of a process for applying library noise reduction filters in response to changes in cooling fan settings.

Referring now to FIG. 5, a flow diagram depicts a process for applying library noise reduction filters in response to changes in cooling fan settings. The process starts at step 82 with a determination of whether the cooling fan status table is updated, such as in response to an indication of a cooling fan setting change. If the fan status table is not being updated, such as with no cooling fan setting change or a small change not sufficient to implicate a different library model, the process continues to step 84 to reference recorded audio data to define an adaptive filter. At step 86, noise source conditions are analyzed, at step 88 noise sources are modeled and, at step 90 an anti-noise signal is generated to cancel recorded noise with an adaptive filter. If at step 82 the cooling fan status table is updated with a change in the cooling fan settings, the process continues to step 92 to request an accelerated convergence mode of the adaptive filter. For example, instead of performing the adaptive filtering at the next scheduled periodic time interval, analysis is initiated as soon as the cooling fan speed changes. As another example, the periodic time interval for performing the adaptive filter analysis is reduced so that more frequent analysis is performed.

At step 94, a match is performed of the new cooling fan status table entry with an anti-noise signal library associated with anticipated noise at the new cooling fan setting. At step 96, the new anti-noise signals from the library are applied for at least a predetermined time period associated with an expected convergence of the adaptive filter to the actual noise characteristics. At step 98, a comparison is performed of the signal models from the library and the adaptive filter generation to determine if the noise cancellation has similar characteristics. If the library and adaptive noise filters share sufficient noise cancellation characteristics, the process continues to step 100 at which the anti-noise signal model from the library is bypassed so that only the adaptive filter is applied to cancel noise. If at step 98, the library and adaptive filters lack sufficient similarity in noise cancellation characteristics, the process continues to step 102 to apply both the library and adaptive filters to cancel noised. At step 104 the noise filter is applied to reduce noise on recorded data and at step 106 the filtered audio is forwarded to applications for use.

Figure 6:
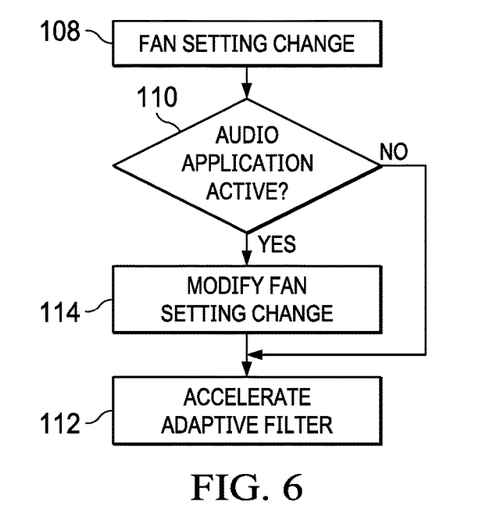
FIG. 6 depicts a flow diagram of a process for modifying cooling fan operations to address audible noise captured by a microphone.

Referring now to FIG. 6, a flow diagram depicts a process for modifying cooling fan operations to address audible noise captured by a microphone. The process starts at step 108 with a cooling fan setting change and continues to step 110 to determine if an audio application is active, such as a videoconference application or VoIP application. If no audio applications are active, the process continues to step 112 to accelerate adaptive filter generation, such as by increasing the priority of adaptive filter generation. If at step 110 a determination is made that the audio application is active, the process continues to step 114 to modify the fan setting change. For example, if a microphone is actively recording voice data, the fan setting change may be delayed until completion of the voice recording, at which time the process proceeds to step 112. As another example, the change in the cooling fan setting is altered to match a stored library filter so that the library filter more effectively cancels noise.

Although the present invention has been described in detail, it should be understood that various changes, substitutions and alterations can be made hereto without departing from the spirit and scope of the invention as defined by the appended claims.

What is claimed is:

1. An information handling system comprising:
    a housing;
    a processor integrated in the housing and operable to execute instructions that process information;
    a memory integrated in the housing and interfaced with the processor, the memory operable to store the instructions and information;
    a cooling fan integrated in the housing and operable to generate a cooling airflow across the processor, the cooling airflow entering through a vent formed in the housing and exiting through an exhaust formed in the housing;
    an embedded controller integrated in the housing and interfaced with the cooling fan, the embedded controller operable to adjust the cooling fan with cooling fan settings to adapt the cooling airflow according to thermal conditions sensed at the housing;
    a microphone integrated in the housing and operable to capture audible sounds as electronic signals;
    an audio processor interfaced with the microphone, the processor and the embedded controller, the audio processor accepting the audible sound electronic signals from the microphone and communicating the audible sound electronic signals in digital form to the processor;
    an adaptive filter interfaced with the audio processor, the adaptive filter operable to analyze the audible sound electronic signals to define a noise reduction filter; and
    a noise reduction filter library having plural library noise reduction filters, each library noise reduction filter associated with a cooling fan setting;
    wherein:
    the embedded controller reports the cooling fan setting to the audio processor, the audio processor applying the library noise reduction filter associated with the cooling fan setting reported by the embedded controller to reduce cooling fan noise in the audible sound electronic signals;
    the adaptive filter comprises instructions executing on the processor;
    the processor prioritizes the adaptive filter instructions in response to a change in cooling fan setting reported by the embedded controller to the processor; and
    the embedded controller cooling fan setting comprises a pulse width modulation to the cooling fan, the embedded controller reporting each change to the pulse width modulation to the audio processor and the processor as a numerical value.

2. The information handling system of claim 1 further comprising:
    one or more applications that use the audible sound electronic signals;
    wherein the embedded controller delays cooling fan setting changes during active use by the one or more applications of the audible sound electronic signals.

3. The information handling system of claim 1 further comprising:
    one or more applications that use the audible sound electronic signals; and
    wherein the embedded controller selects cooling fan settings that align with noise reduction filter library cooling fan settings during active use by the one or more applications of the audible sound electronic signals.

4. An information handling system comprising:
    a housing;
    a processor integrated in the housing and operable to execute instructions that process information;
    a memory integrated in the housing and interfaced with the processor, the memory operable to store the instructions and information;
    a cooling fan integrated in the housing and operable to generate a cooling airflow across the processor, the cooling airflow entering through a vent formed in the housing and exiting through an exhaust formed in the housing;
    an embedded controller integrated in the housing and interfaced with the cooling fan, the embedded controller operable to adjust the cooling fan with cooling fan settings to adapt the cooling airflow according to thermal conditions sensed at the housing;
    a microphone integrated in the housing and operable to capture audible sounds as electronic signals;
    an audio processor interfaced with the microphone, the processor and the embedded controller, the audio processor accepting the audible sound electronic signals from the microphone and communicating the audible sound electronic signals in digital form to the processor;
    an adaptive filter interfaced with the audio processor, the adaptive filter operable to analyze the audible sound electronic signals to define a noise reduction filter; and
    a noise reduction filter library having plural library noise reduction filters, each library noise reduction filter associated with a cooling fan setting;
    wherein:
    the embedded controller reports the cooling fan setting to the audio processor, the audio processor applying the library noise reduction filter associated with the cooling fan setting reported by the embedded controller to reduce cooling fan noise in the audible sound electronic signals;
    the adaptive filter analyzes unfiltered sound communicated from the audio processor to define a noise reduction filter and communicates the noise reduction filter to the audio processor for application to audible sound electronic signals;
    the audio processor stores the noise reduction filter in the noise reduction filter library in association with a last reported cooling fan setting;
    the audio processor compares the noise reduction filter and the library noise reduction filter, the audio processor canceling the library noise reduction filter if predetermined similar characteristics exist.

5. The information handling system of claim 4 wherein the audio processor compares the noise reduction filter and the library noise reduction filter, the audio processor continuing both the library noise reduction filter and the noise reduction filter if predetermined dissimilar characteristics exist.

6. A method for managing audible noise recorded by an information handling system microphone, the method comprising:
receiving at an audio processor a cooling fan setting;
retrieving from a library by the audio processor a library noise reduction filter associated with the cooling fan setting;
applying the library noise reduction filter to sounds captured by the microphone;
analyzing unfiltered sounds captured by the microphone after the cooling fan setting with an adaptive filter to determine a noise reduction filter;
applying the noise reduction filter to sounds captured by the microphone;
comparing characteristics of the library noise reduction filter and the noise reduction filter determined by the adaptive filter; and
if the comparing finds one or more predetermined similarities, applying only the noise reduction filter determined by the adaptive filter.

7. The method of claim 6 further comprising:
detecting at an embedded controller a change in thermal conditions;
determining with the embedded controller a cooling fan setting for the thermal conditions;
communicating the cooling fan setting to the audio processor; and
applying the cooling fan setting to the cooling fan.

8. The method of claim 7 further comprising:
determining an application is using sounds captured by the microphone;
in response to the determining, altering the applying the cooling fan setting to the cooling fan.

9. The method of claim 8 wherein the altering the applying the cooling fan setting further comprises delaying the applying the cooling fan setting until the application completes using sounds captured by the microphone.

10. The method of claim 8 wherein the altering the applying the cooling fan setting further comprises:
selecting a cooling fan setting having a library noise reduction filter stored in the library, the selected cooling fan setting proximate in value to the cooling fan setting determined by the embedded processor; and
applying the selected cooling fan setting instead of the determined cooling fan setting.

11. The method of claim 6 further comprising:
if the comparing finds one or more similarities, copy the noise reduction filter determined by the adaptive filter to the library.

12. The method of claim 6 wherein detecting further comprises:
communicating the cooling fan setting to the adaptive filter; and
in response to receiving the cooling fan setting at the adaptive filter, accelerating the analyzing unfiltered sounds.

13. An audio system comprising:
a microphone operable to capture audible sounds as electronic signals;
an audio processor interfaced with the microphone and operable to process the audible sound electronic signals into a digital format, the audible processor applying one or more noise reduction filters;
a noise reduction filter library having plural library noise reduction filters including at least a set of plural library noise reduction filters associated with cooling fan settings;
an adaptive filter operable to analyze the audible sound electronic signals to define a noise reduction filter that reduces noise included in the sound electronic signals;
wherein the audio processor receives a cooling fan setting and in response applies the library noise reduction filter associated with the cooling fan setting to filter the audible sound electronic signals;
wherein the processor provides unfiltered audible sound electronic signals to the adaptive filter in response to the cooling fan setting to accelerate definition of a noise reduction filter in response to the cooling fan setting; and
wherein the adaptive filter compares the library noise reduction filter and the defined noise reduction filter and, if predetermined similarities exist, applies only the defined noise reduction filter.

* * * * *